(12) United States Patent
Smith et al.

(10) Patent No.: US 11,904,538 B2
(45) Date of Patent: Feb. 20, 2024

(54) SYSTEMS AND METHODS FOR SIMULTANEOUSLY MANUFACTURING A PLURALITY OF OBJECTS

(71) Applicant: The Boeing Company, Chicago, IL (US)

(72) Inventors: Daniel R. Smith, Chicago, IL (US); Darrell D. Jones, Chicago, IL (US); Raviendra S. Suriyaarachchi, Chicago, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/505,582

(22) Filed: Oct. 19, 2021

(65) Prior Publication Data

US 2022/0168953 A1 Jun. 2, 2022

Related U.S. Application Data

(60) Provisional application No. 63/118,873, filed on Nov. 27, 2020.

(51) Int. Cl.
*B29C 64/182* (2017.01)
*B33Y 10/00* (2015.01)
(Continued)

(52) U.S. Cl.
CPC .......... *B29C 64/182* (2017.08); *B29C 64/209* (2017.08); *B29C 64/379* (2017.08);
(Continued)

(58) Field of Classification Search
None
See application file for complete search history.

(56) References Cited

U.S. PATENT DOCUMENTS 6,193,923 B1 * 2/2001 Leyden ................ B29C 41/36
264/401
7,828,022 B2 * 11/2010 Davidson ............. B29C 64/35
264/497

(Continued)

FOREIGN PATENT DOCUMENTS

CN 109396862 A * 3/2019 ............ B23P 23/06
EP 0 686 901 A2 12/1995
(Continued)

OTHER PUBLICATIONS

C. Wang et al., "Machine learning in additive manufacturing: State-of-the-art and perspectives", Aug. 16, 2020, Retrieved from the Internet: URL:https://reader.elsevier.com/reader/sd/ pii/S2214860420309106?token=0787871F087F07 3A7ACB0B4D6C3 B02AF76985CD424AE428BBB7CAD4A5179290CB1DB932866 E5BDB0218AD274B8D6A3DI [retrieved on Nov. 2, 2020].

(Continued)

*Primary Examiner* — Jason Lin
(74) *Attorney, Agent, or Firm* — McDonnell Boehnen Hulbert & Berghoff LLP

(57) ABSTRACT

An example method for simultaneously manufacturing a plurality of objects is described. The method includes simultaneously cycling a plurality of pallets through a conveyor system. The conveyor system is cyclical, and the conveyor system includes an entrance point for each pallet, an exit point, and a plurality of manufacturing points corresponding to a plurality of manufacturing devices. Simultaneously cycling the plurality of pallets includes simultaneously cycling the plurality of pallets past the plurality of manufacturing points for two or more cycles, wherein each pallet is associated with a set of manufacturing instructions for a corresponding object. The method further includes, while simultaneously cycling the plurality of pallets through the conveyor system, using a different combination of the plu- (Continued)

rality of manufacturing devices to manufacture each object in accordance with the set of manufacturing instructions associated with each pallet, thereby manufacturing different objects for each pallet.

20 Claims, 5 Drawing Sheets

(51) Int. Cl.
    *B33Y 30/00*     (2015.01)
    *B33Y 40/00*     (2020.01)
    *B33Y 50/02*     (2015.01)
    *B29C 64/379*     (2017.01)
    *B29C 64/209*     (2017.01)
    *B29C 64/393*     (2017.01)
    *G05B 19/418*     (2006.01)

(52) U.S. Cl.
    CPC ............ *B29C 64/393* (2017.08); *B33Y 10/00* (2014.12); *B33Y 30/00* (2014.12); *B33Y 40/00* (2014.12); *B33Y 50/02* (2014.12); *G05B 19/4189* (2013.01)

(56) References Cited

U.S. PATENT DOCUMENTS

| | | | | |
|---|---|---|---|---|
| 8,392,011 B2 * | 3/2013 | Segawa | ............. | H01L 21/67294 |
| | | | | 700/121 |
| 9,868,257 B1 * | 1/2018 | Strand | ................... | B29C 64/386 |
| 10,207,452 B2 * | 2/2019 | Mandel | ................... | B29C 64/20 |
| 10,449,712 B2 * | 10/2019 | Yoo | ....................... | B29C 64/165 |
| 2004/0005182 A1 * | 1/2004 | Gaylo | ................... | B22F 12/226 |
| | | | | 400/283 |
| 2007/0150088 A1 * | 6/2007 | Silverbrook | ......... | B05C 5/0212 |
| | | | | 700/119 |
| 2011/0254496 A1 * | 10/2011 | Barkman | ............. | G05B 19/182 |
| | | | | 318/561 |
| 2015/0298467 A1 * | 10/2015 | Cofler | ................... | B41F 17/006 |
| | | | | 347/16 |
| 2016/0200084 A1 * | 7/2016 | Hays | ...................... | B33Y 10/00 |
| | | | | 156/62.2 |
| 2018/0036800 A1 * | 2/2018 | Torabi | .................... | B33Y 10/00 |
| 2018/0290386 A1 * | 10/2018 | DeCiccio | .................. | A61L 2/22 |
| 2018/0339456 A1 * | 11/2018 | Czinger | ................ | B29C 70/205 |
| 2020/0096970 A1 * | 3/2020 | Mehr | ................. | B22F 10/18 |
| 2020/0160497 A1 * | 5/2020 | Shah | ..................... | H04N 23/56 |
| 2021/0197491 A1 * | 7/2021 | Hollander | ............. | B33Y 40/00 |
| 2022/0197306 A1 * | 6/2022 | Cella | ........................ | B25J 9/163 |

FOREIGN PATENT DOCUMENTS

| | | | |
|---|---|---|---|
| EP | 3 214 024 A1 | 9/2017 | |
| EP | 3 566 869 A2 | 11/2019 | |
| JP | 2015507250 A * | 3/2015 | ........... G06F 3/1255 |
| WO | 2014/039378 A1 | 3/2014 | |

OTHER PUBLICATIONS

Li Qiang et al., "Production planning in additive manufacturing and 3D printing", Computers and Operations Research, Oxford, GB, vol. 83, Jan. 25, 2017, pp. 157-172.

Extended European Search Report prepared by the European Patent Office in application No. EP 21 20 5044 dated Apr. 5, 2022.

* cited by examiner

400

```
┌─────────────────────────────────────────────────────────────┐
│   SIMULTANEOUSLY CYCLING A PLURALITY OF PALLETS THROUGH A   │ 402
│  CONVEYOR SYSTEM, WHEREIN THE CONVEYOR SYSTEM IS CYCLICAL,  │
│   AND WHEREIN THE CONVEYOR SYSTEM COMPRISES AN ENTRANCE     │
│   POINT FOR EACH PALLET, AN EXIT POINT, AND A PLURALITY OF  │
│    MANUFACTURING POINTS CORRESPONDING TO A PLURALITY OF     │
│   MANUFACTURING DEVICES, AND WHEREIN SIMULTANEOUSLY         │
│   CYCLING THE PLURALITY OF PALLETS COMPRISES                │
│   SIMULTANEOUSLY CYCLING THE PLURALITY OF PALLETS PAST      │
│   THE PLURALITY OF MANUFACTURING POINTS FOR TWO OR MORE     │
│   CYCLES, WHEREIN EACH PALLET IS ASSOCIATED WITH A SET OF   │
│   MANUFACTURING INSTRUCTIONS FOR A CORRESPONDING OBJECT     │
└─────────────────────────────────────────────────────────────┘
                              │
                              ▼
┌─────────────────────────────────────────────────────────────┐
│  WHILE SIMULTANEOUSLY CYCLING THE PLURALITY OF PALLETS      │ 404
│  THROUGH THE CONVEYOR SYSTEM, USING A DIFFERENT COMBINATION │
│  OF THE PLURALITY OF MANUFACTURING DEVICES TO MANUFACTURE   │
│  EACH OBJECT IN ACCORDANCE WITH THE SET OF MANUFACTURING    │
│  INSTRUCTIONS ASSOCIATED WITH EACH PALLET, THEREBY          │
│  MANUFACTURING DIFFERENT OBJECTS FOR EACH PALLET            │
└─────────────────────────────────────────────────────────────┘
```

FIGURE 4

SYSTEMS AND METHODS FOR SIMULTANEOUSLY MANUFACTURING A PLURALITY OF OBJECTS

CROSS REFERENCE TO RELATED APPLICATION

The present application is a non-provisional patent application claiming priority to U.S. Provisional Application No. 63/118,873, filed on Nov. 27, 2020, the contents of which are hereby incorporated by reference.

FIELD

The present disclosure relates generally to manufacturing objects. In particular, the following description relates to simultaneously manufacturing different objects using a plurality of manufacturing devices.

BACKGROUND

Manufacturing objects using additive manufacturing, such as with one or more lamination devices, involves repeatedly laying down layers of material. Each layer is shaped in accordance with features of the object being manufactured. Different manufacturing devices can be used to sequentially place layers that have different qualities, such as width or material composition. Thus, an object can be manufactured by changing from one manufacturing device to another.

When a plurality of different objects are manufactured using a plurality of manufacturing devices, delays or inefficiencies may result from a single object moving between the plurality of manufacturing devices and effectively using more than one manufacturing device at a given time.

What is needed is a system that allows for a plurality of objects to be manufactured simultaneously using a plurality of manufacturing devices.

In an example, a system for simultaneously manufacturing a plurality of objects described. The system includes a plurality of pallets associated with a plurality of objects to be manufactured, a plurality of manufacturing devices, wherein each manufacturing device is configured for performing different aspects of manufacturing the plurality of objects, and a conveyor system for moving each of the plurality of pallets to one or more of the manufacturing devices. The conveyor system is cyclical, and the conveyor system includes an entrance point for each pallet, an exit point, and a plurality of manufacturing points corresponding to the plurality of manufacturing devices. The system further includes a computing device. The computing device includes one or more processors, a memory, and a non-transitory computer readable medium having instructions stored thereon that, when executed by the one or more processors cause a set of functions to be performed. The set of functions includes simultaneously cycling the plurality of pallets through the conveyor system and past the plurality of manufacturing points for two or more cycles. Each pallet is associated with a set of manufacturing instructions for a corresponding object. The set of functions further includes, while simultaneously cycling the plurality of pallets through the conveyor system, using a different combination of the plurality of manufacturing devices to manufacture each object in accordance with the set of manufacturing instructions associated with each pallet, thereby manufacturing different objects for each pallet.

In another example, a method for simultaneously manufacturing a plurality of objects is described. The method includes simultaneously cycling a plurality of pallets through a conveyor system. The conveyor system is cyclical, and the conveyor system includes an entrance point for each pallet, an exit point, and a plurality of manufacturing points corresponding to a plurality of manufacturing devices. Simultaneously cycling the plurality of pallets includes simultaneously cycling the plurality of pallets past the plurality of manufacturing points for two or more cycles, wherein each pallet is associated with a set of manufacturing instructions for a corresponding object. The method further includes, while simultaneously cycling the plurality of pallets through the conveyor system, using a different combination of the plurality of manufacturing devices to manufacture each object in accordance with the set of manufacturing instructions associated with each pallet, thereby manufacturing different objects for each pallet.

In another example, a non-transitory computer readable medium is described. The non-transitory computer readable medium has instructions stored thereon that, when executed by one or more processors, cause a set of functions to be performed. The set of functions includes simultaneously cycling a plurality of pallets through a conveyor system. The conveyor system is cyclical, and the conveyor system includes an entrance point for each pallet, an exit point, and a plurality of manufacturing points corresponding to a plurality of manufacturing devices. Simultaneously cycling the plurality of pallets includes simultaneously cycling the plurality of pallets past the plurality of manufacturing points for two or more cycles, wherein each pallet is associated with a set of manufacturing instructions for a corresponding object. The set of functions further includes, while simultaneously cycling the plurality of pallets through the conveyor system, using a different combination of the plurality of manufacturing devices to manufacture each object in accordance with the set of manufacturing instructions associated with each pallet, thereby manufacturing different objects for each pallet.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 4 illustrates a flowchart of a method for simultaneously manufacturing a plurality of objects, according to an example implementation.

DETAILED DESCRIPTION

Figure 1:
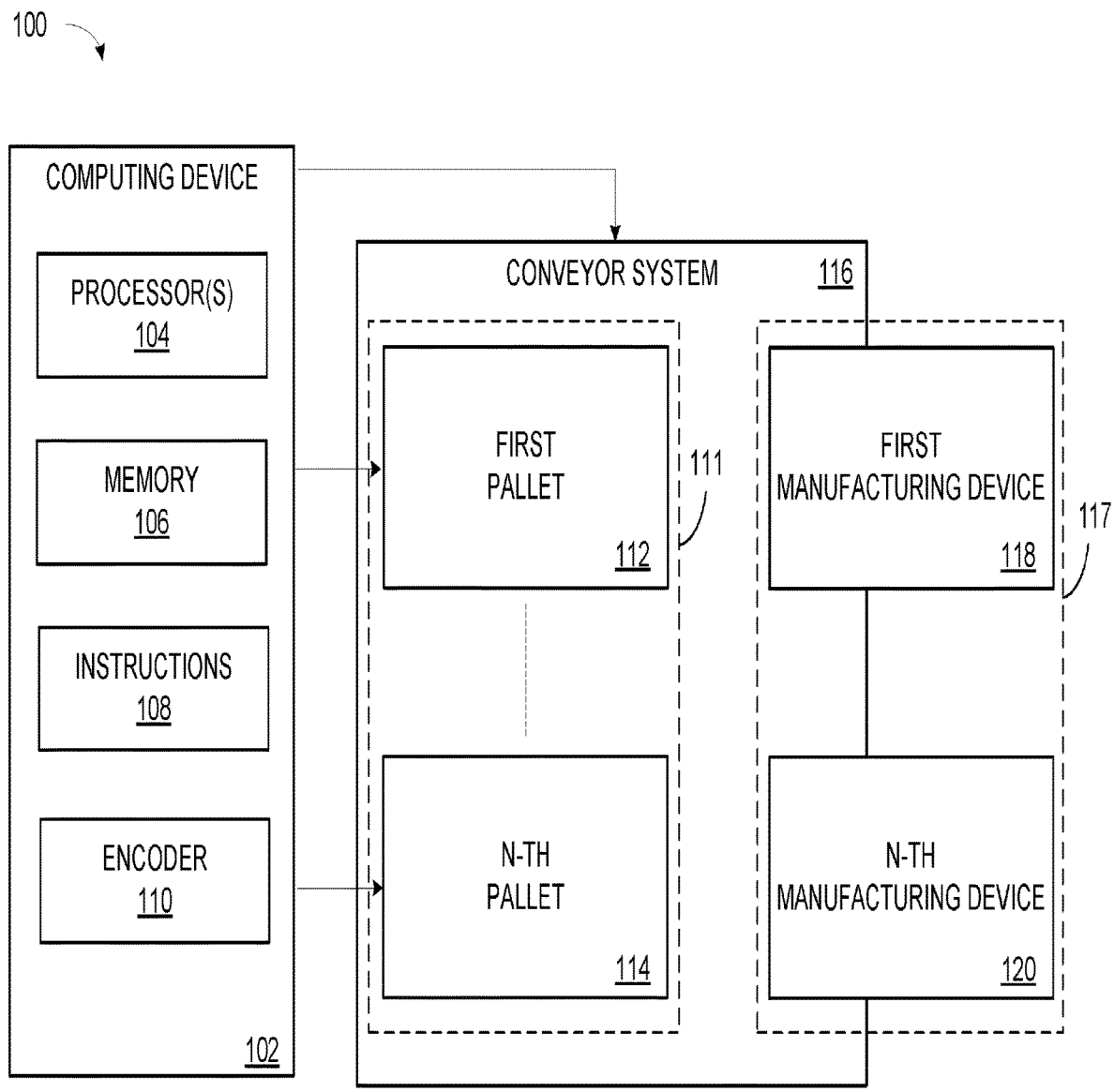
FIG. 1 illustrates a block diagram of a system, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Example systems and methods for simultaneously manufacturing objects are described. In these examples, different objects may have different manufacturing specifications that involve using different manufacturing devices, and possibly involve moving an object back and forth between different manufacturing devices. In conventional manufacturing systems, this use of multiple devices to construct a single object may prevent other objects from being manufactured until a first object is manufactured, then a second object, and so on. Examples described herein provide a framework for allowing multiple different objects to be manufactured simultaneously while efficiently using manufacturing devices, thereby decreasing an average time to produce each object.

Within examples, a system includes a conveyor system that cycles pallets past a plurality of manufacturing devices. Each manufacturing device performs a different aspect of manufacturing objects on the pallets. For example, each manufacturing device may be a lamination device that lays down a particular material, at a particular width, in a particular direction. These unique aspects of each manufacturing device dictate which manufacturing device performs each portion of a manufacturing process for each object. Accordingly, manufacturing instructions for a given object correspond to a sequence of manufacturing devices that gradually build each object over multiple cycles. Multiple objects can be cycled at the same time to use each manufacturing device more consistently.

Within examples, each pallet is encoded with manufacturing instructions for a corresponding object to be manufactured. The manufacturing devices read the manufacturing instructions and automatically carry out the instructions to manufacture the object. The manufacturing devices also encode manufacturing details (e.g., a start time and end time for each step of the manufacturing instructions, an amount of material laid on the part for each step, an amount of remaining material stored in the manufacturing device, or other operational statuses associated with manufacturing the object or with the manufacturing device). In this manner, the manufacturing devices can automatically pass the object along to each other until the object has been completed without using repeated instructions from a central controller. Further, the manufacturing details encoded onto each pallet can be used for evaluating performance of each manufacturing device and the system as a whole. For example, the manufacturing details can be read from a pallet after the corresponding object is manufactured, and a machine learning model can provide an output indicative of a performance level of each manufacturing device. In this manner, the system can perform predictive maintenance on the manufacturing devices, and optimize manufacturing instructions for subsequent objects.

Within examples, each object is a part of a larger assembly. For example, each object can be a different component (e.g., different stringers) of an aircraft. The objects can be manufactured in a particular order in view of manufacturing characteristics of the system (e.g., a number and type of manufacturing devices along the conveyor system) to decrease assembly time. For example, a machine learning model can be trained to predict an output order of manufactured objects that results from an input order, and the input order can be optimized to achieve a desired output order and and/or a desired manufacturing time.

Referring now to the figures, FIG. 1 illustrates a block diagram of a system, according to an example implementation. In particular, FIG. 1 shows a system 100 for simultaneously manufacturing a plurality of objects. In the depicted example, system 100 includes a computing device 102, a conveyor system 116, a plurality of pallets 111, and a plurality of manufacturing devices 117.

System 100 can be a computing system that includes one or more computing devices, such as computing device 102. For example, the computing device 102 can be a central controller of the system 100, and can interact with one or more additional computing devices to perform functions. The computing device 102 includes processor(s) 104, a memory 106, instructions 108, and an encoder 110.

Processor(s) 104 may be general-purpose processors or special purpose processors (e.g., digital signal processors, application specific integrated circuits, etc.). Processor(s) 104 are configured to execute the instructions 108 stored in the memory 106 to provide the functionality of the computing device 102 and related systems and methods described herein.

The memory 106 may include or take the form of one or more computer-readable storage media that can be read or accessed by processor(s) 104. The computer-readable storage media can include volatile and/or non-volatile storage components, such as optical, magnetic, organic or other memory or disc storage, which can be integrated in whole or in part with processor(s) 104. In some examples, memory 106 can be implemented using a single physical device (e.g., one optical, magnetic, organic or other memory or disc storage unit), while in other examples, memory 106 can be implemented using two or more physical devices. The memory 106 thus is a non-transitory computer readable storage medium, and the instructions 108 are stored thereon. The instructions 108 include computer executable code.

The conveyor system 116 includes one or more movable components (e.g., bearings, rollers, servos, or other rotational or translational components) and one or more surfaces that serve as a platform for the plurality of pallets 111. The movable components cause the platform to move, thereby translating the pallets from one position to another. The plurality of pallets 111 includes at least a first pallet 112 and an n-th pallet 114, which are disposed on the conveyor system 116. As the conveyor system operates, the plurality of pallets 111 are cycled past the plurality of manufacturing devices 117, stopping each time a manufacturing device begins to operate on a particular object associated with a given pallet.

The plurality of manufacturing devices 117 includes at least a first manufacturing device 118 and an n-th manufacturing device 120. The number of manufacturing devices 117 is not necessarily the same as the number of pallets. Each manufacturing device performs a different aspect of manufacturing objects associated with the plurality of pallets 111. For example, each manufacturing device can be a multi-spindle lamination cell that lays a different material, lays a different width or thickness of material, or lays material in a different direction. Other types of manufacturing devices 117, such as additive manufacturing devices, are possible. To manufacture a particular object, different combinations of manufacturing devices 117 can be used.

Each pallet in the plurality of pallets 111 includes a memory device that is encoded by the encoder 110. For example, each pallet can include a Radio-Frequency Identification (RFID) chip encoded by the encoder. In these examples, the encoder 110 may be an RFID encoder, and each RFID chip can be encoded with manufacturing instructions for a given object. In other examples, the pallets may each include a memory configured similarly to memory 106, and each memory can be encoded with manufacturing instructions for a given object. Different memory devices for storing manufacturing instructions are possible.

Each manufacturing device may also include an encoder to store manufacturing details on the pallet. Based on the manufacturing instructions and manufacturing details on each pallet, each manufacturing device can determine a stage of manufacture of each object, and can automatically determine whether to continue performing manufacturing task (e.g., laying one or more layers of material) for the object. Each time a manufacturing device begins performing a manufacturing task, the manufacturing device can send a signal to the conveyor system 116 or the computing device 102 to stop at least a portion of the platform of the conveyor system.

Accordingly, FIG. 1 shows a system having a plurality of pallets 111 associated with a plurality of objects to be manufactured, a plurality of manufacturing devices 117, each manufacturing device being configured for performing different aspects of manufacturing the plurality of objects, the conveyor system 116 for moving each of the plurality of pallets 111 to one or more of the manufacturing devices 117, and the computing device 102. The computing device includes one or more processors, a memory, and a non-transitory computer readable medium having instructions stored thereon that, when executed by the one or more processors cause a set of functions to be performed. The set of functions includes simultaneously cycling the plurality of pallets 111 through the conveyor system for a plurality of cycles, and while simultaneously cycling the plurality of pallets 111 through the conveyor system, using a different combination of the plurality of manufacturing devices 117 to manufacture each object in accordance with a set of manufacturing instructions associated with each pallet, thereby manufacturing different objects for each pallet. Further details of simultaneously manufacturing a plurality of objects are provided below with respect to FIGS. 2A and 2B.

Figure 2A:
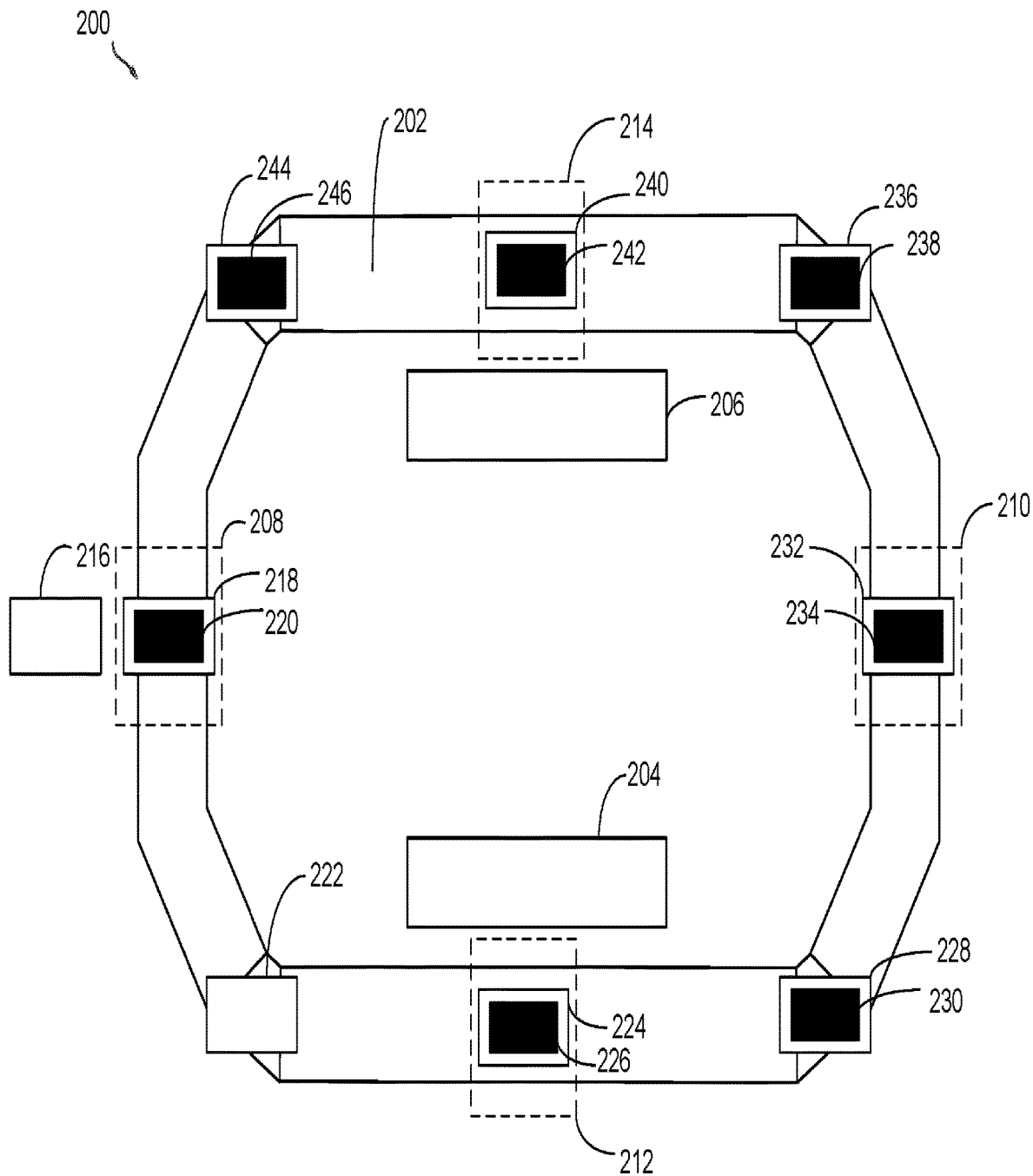
FIG. 2A illustrates a system for simultaneously manufacturing objects at a first time, according to an example implementation.

FIG. 2A illustrates a system for simultaneously manufacturing objects at a first time, according to an example implementation. In particular, FIG. 2A shows a system 200 having a conveyor system 202 that is controlled by a computing device (e.g., the computing device 102). The system 200 further includes a first manufacturing device 204, a second manufacturing device, a plurality of pallets, and a plurality of objects. As shown in FIG. 2A, the conveyor system 202 is configured to cycle the pallets past the manufacturing devices to construct the plurality of objects. In this context, a complete cycle can be understood as moving from a given point on the conveyor system 202 and eventually returning to the given point. In FIG. 2A, an entrance point 208, an exit point 210, a first manufacturing point 212, and a second manufacturing point 214. In practice, there may include a plurality of manufacturing points that each correspond to a manufacturing device, and as the pallets cycle through the conveyor system 202 objects will gradually be manufactured by the manufacturing devices. Some objects may require several cycles to be completed, while others might take only a few cycles.

At the first time, a first pallet 216 is waiting to enter the conveyor system 202 at the entrance point 208. A second pallet 218 with a second object 220 is at the entrance point 208. A third pallet 222 is between the entrance point 208 and the first manufacturing point 212. A fourth pallet 224 with a fourth object 226 is at the first manufacturing point 212. In the example shown in FIG. 2A, the first manufacturing device 204 reads manufacturing instructions and manufacturing details on the fourth pallet 224 to determine that it should perform manufacturing tasks for the fourth object 226. A fifth pallet 228 with a fifth object 230 is between the first manufacturing point and the exit point 210. A sixth pallet 232 with a sixth object 234 is at the exit point 210. A seventh pallet 236 with a seventh object 238 is between the exit point 210 and the second manufacturing point 214. An eighth pallet 240 with an eighth object 242 is at the second manufacturing point 214. In the example shown in FIG. 2A, the second manufacturing device 206 reads manufacturing instructions and manufacturing details on the eighth pallet 240 to determine that it should perform manufacturing tasks for the eighth object 242. A ninth pallet 244 with a ninth object 246 is between the second manufacturing point 214 and the entrance point 208.

Each object in FIG. 2A may be at a different stage of manufacture. In some examples, the conveyor system 202 can be optimized to ensure more efficient usage of the manufacturing devices. For example, the fourth object 226 and the eighth object 242 can have manufacturing tasks that require different amounts of time to complete. However, the first manufacturing device 204 and the second manufacturing device 206 can coordinate to stop their respective manufacturing tasks at the same time. For example, a first manufacturing task may take 30 seconds, and a second manufacturing task may take 60 seconds, so the second manufacturing task may get cut short after 30 seconds to ensure that both manufacturing devices work at the same time. The second manufacturing task can be completed during another cycle, or by another manufacturing device. In other examples, the conveyor system 202 may have independent sections that move pallets having objects that do not require a manufacturing task past a manufacturing device to allow another pallet to move to a manufacturing point. Other ways of optimizing manufacturing device usage are possible.

Figure 2B:
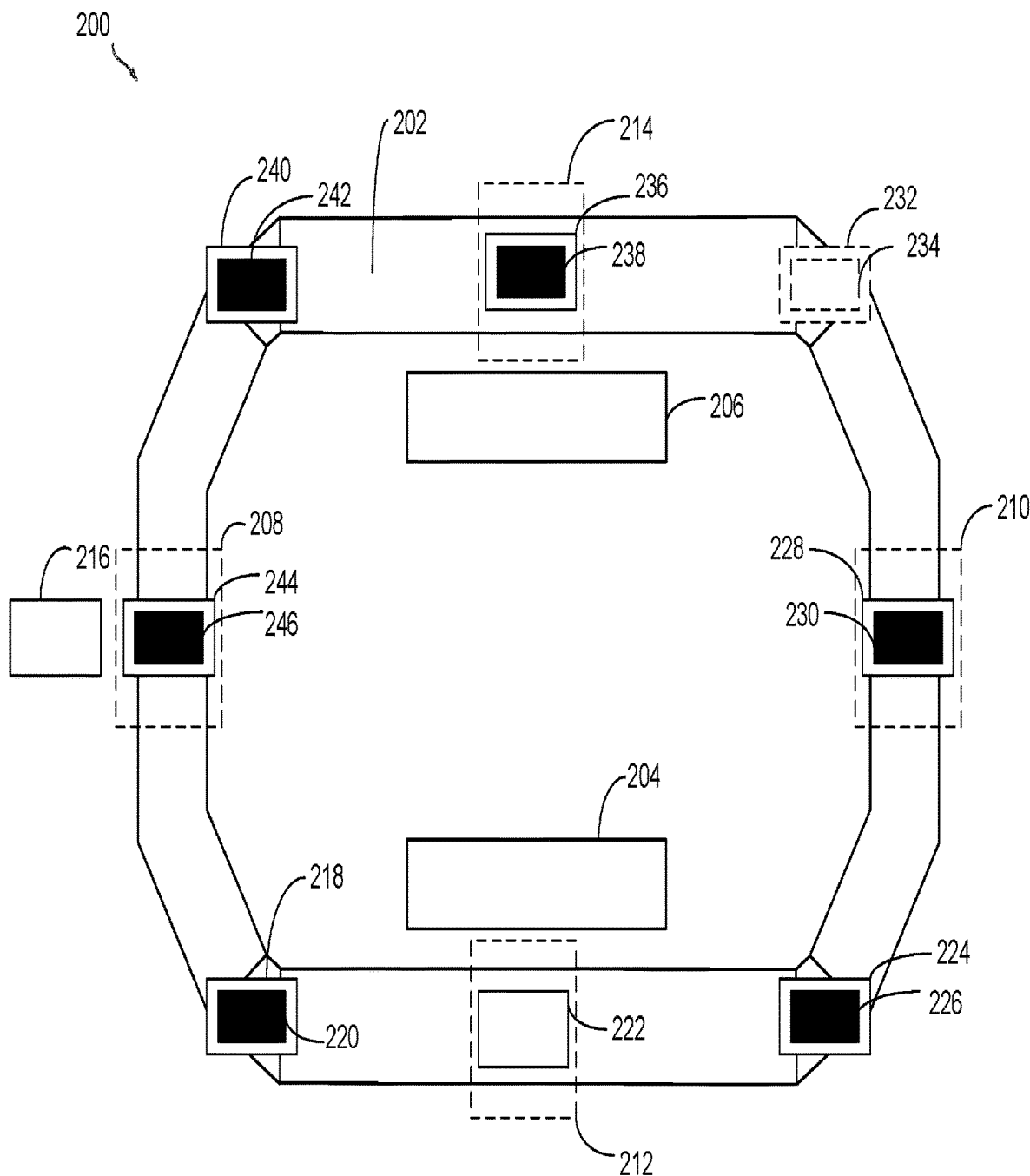
FIG. 2B illustrates a system for simultaneously manufacturing objects at a second time, according to an example implementation.

FIG. 2B illustrates the system 200 for simultaneously manufacturing objects at a second time, according to an example implementation. At the second time, the first pallet 216 is still waiting to enter the conveyor system 202 at the entrance point 208. The ninth pallet 244 with the ninth object 246 is at the entrance point 208. The second pallet 218 with the second object 220 is between the entrance point 208 and the first manufacturing point 212. The third pallet 222 is at the first manufacturing point 212. In the example shown in FIG. 2B, the first manufacturing device 204 reads manufacturing instructions on the third pallet 222 to determine that it should not perform manufacturing tasks. The fourth pallet 224 with the fourth object 226 is between the first manufacturing point and the exit point 210. The fifth pallet 228 with the fifth object 230 is at the exit point 210. The sixth pallet 232 with the sixth object 234 exited at the exit point 210 between the first time and the second time, and is no longer on the conveyor system 202. The seventh pallet 236 with the seventh object 238 is at the second manufacturing point 214. In the example shown in FIG. 2B, the second manufacturing device 206 reads manufacturing instructions and manufacturing details on the seventh pallet 236 to determine that it should not perform manufacturing tasks for the seventh object 238. The eighth pallet 240 with the eighth object 242 is between the second manufacturing point 214 and the entrance point 208.

FIG. 2B shows an example in which the system 200 has been optimized to place pallets (the third pallet 222 and the seventh pallet 236) across from one another that have similar manufacturing instructions at a given time. For example, the seventh object 238 and a third object to be manufactured on the third pallet 222 may be the same part, and can be separated by a single cycle to optimize how the objects are manufactured. Other ways of ordering pallets and corresponding objects are possible. For example, as described further below with respect to FIG. 3, a machine learning model, a statistical model, a cost function, a logic tree, or another method can be used for optimizing use of the conveyor system 202 such that the manufacturing devices are used efficiently and objects are manufactured quickly.

Figure 3:
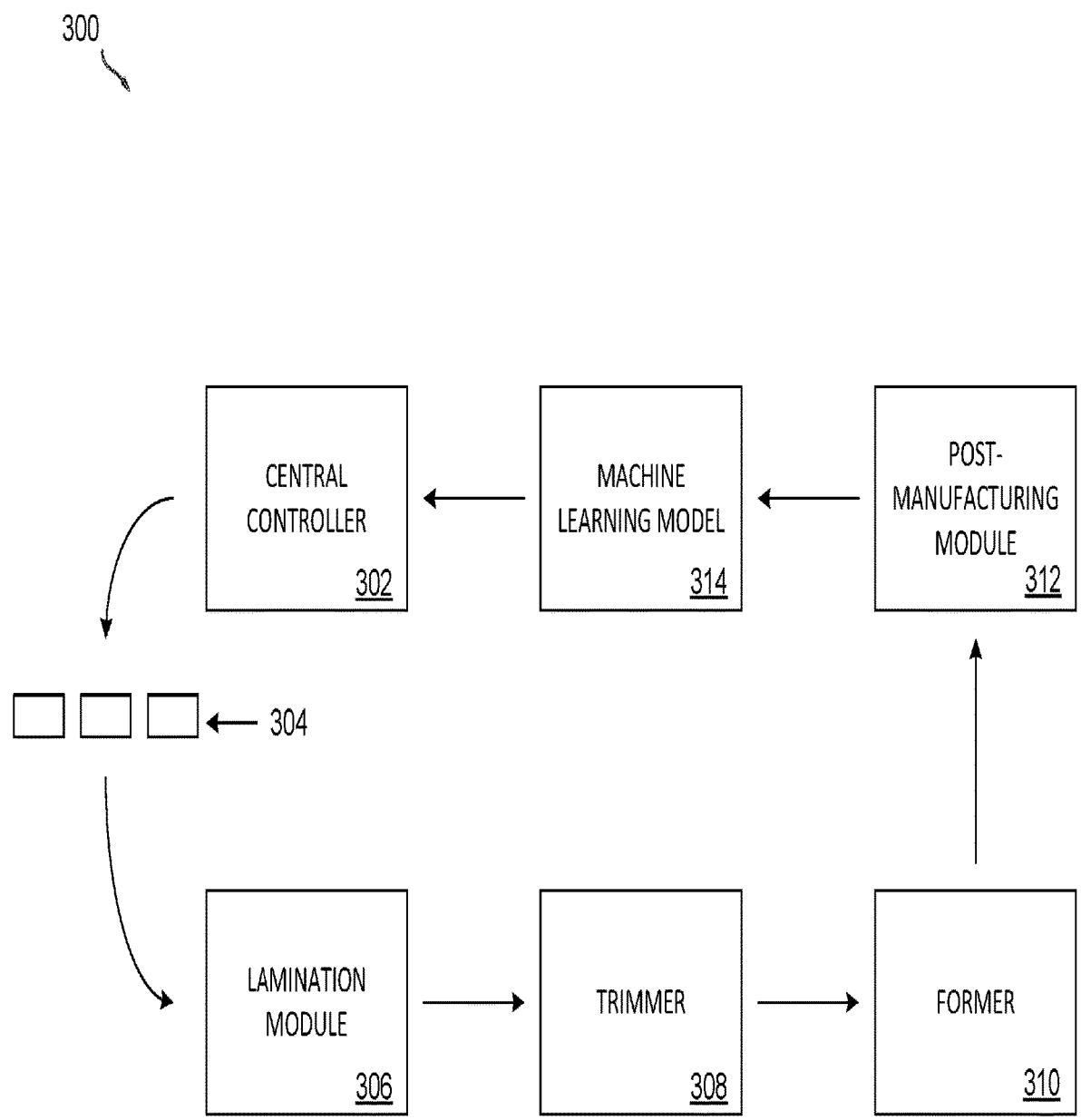
FIG. 3 illustrates a block diagram of a system, according to an example implementation.

FIG. 3 illustrates a block diagram of a system, according to an example implementation. In particular, FIG. 3 shows a central controller 302, a plurality of pallets 304, a lamination module 306, a trimmer 308, a former 310, a post-manufacturing module 312, and a machine learning model 314. The central controller 302 is a computing device that can be the same as or similar to the computing device 102. Each pallet in the plurality of pallets 304 is a movable surface used for transporting a corresponding plurality on a conveyor system while the plurality of objects is manufactured. The lamination module 306 includes a plurality of lamination devices configured for additive manufacturing of the plurality of objects (other types of modules can be used for different manufacturing techniques). For example, the lamination module 306 may include a plurality of devices with different laminate heads that each correspond to one or more of a different laminate width, a different laminate composition, and a different laminate layout direction. The trimmer 308 is one or more devices used for removing excess materials from manufactured objects. Within examples, the trimmer 308 can be included on the same conveyor system as the lamination module 306 in order to combine manufacturing and trimming steps. The former 310 is one or more devices used for treating surfaces of manufactured and trimmed objects or otherwise finalizing objects for use in assembling a larger system (e.g., an aircraft).

The post-manufacturing module 312 can be a submodule of the central controller 302 that retrieves information from each pallet after an object has been manufactured, trimmed, and formed. The information includes identifying information of the manufactured object, manufacturing instructions encoded on the pallets by the computing device 102, and manufacturing details encoded on the pallets by the lamination module 306 or one or more other types of manufacturing devices. Collectively, this information may show expected characteristics of manufacturing the object (e.g., desired times to start and complete each step of the instructions), and actual characteristics of manufacturing the object (e.g., actual times to start and complete each step of the instructions). This information is indicative of how effectively the central controller 302 planned manufacturing the object, and how effective the manufacturing devices were in manufacturing the object. The post-manufacturing module 312 provides this information, or a representation thereof, to the machine learning model 314 in order to optimize manufacture of subsequent objects and to predictively maintain manufacturing devices. Other methods can be used for this optimization, such as a statistical model, a cost function, a logic tree, or another optimization method.

The machine learning model 314 can be a random forest model, support vector machine (SVM), a neural network, or any other type of algorithm that uses machine learning. Machine learning may generally relate to computer assisted processing of inputs that uses statistical techniques to automatically improve task performance in the classification of data sets. Machine learning may include supervised learning, where historical data is labeled with the appropriate classification. In this case the supervised algorithm mathematically optimizes equations that separate the data by the corresponding label. Unsupervised training, where desired outputs are not provided when training the model, can be used to identify hypothesized labels through various clustering techniques, and results in preparing data for supervised training. The machine learning model 314 can be stored in a machine learning model server, or can be stored in the central controller 302. In examples, the post-manufacturing module 312 provides values using information stored on the pallets as inputs to one or more machine learning models.

Having been trained, the machine learning model can be executed to evaluate performance of manufacturing devices and to suggest the order and timing of manufacturing objects. For example, the post-manufacturing module 312 may provide data similar to that used to train the machine learning model. The machine learning model may be executed to provide an output based on receiving the test data. The central controller 302 may receive the output from the machine learning model. The output of the machine learning model might be a binary indication that a manufacturing device requires maintenance or does not require maintenance, or a performance score for the manufacturing device. Based on the binary indication or performance score, the central controller 302 may provide an instruction to cause or schedule a manufacturing device be maintained.

In other examples, the output received from the machine learning model 314 may indicate a level of efficiency for the manufacturing devices relating to a ratio of time during which each manufacturing device is in use relative to time during which each manufacturing device is not in use. This may be used for optimizing an order of objects for manufacturing, and thereby to increase manufacturing efficiency. Other ways of optimizing manufacturing efficiency are possible.

FIG. 4 illustrates a flowchart of a method 400 for simultaneously manufacturing a plurality of objects, according to an example implementation. The method 400 shown in FIG. 4 presents an example of a method that could be used with the system 100, the system 200, and the system 300 shown in FIGS. 1, 2A, 2B, and 3, a combination thereof, or with components of thereof. Further, the functions described with respect to FIG. 4 may be supplemented by, replaced by, or combined with functions described above with respect to FIGS. 1, 2A, 2B, and 3. Further, devices or systems may be used or configured to perform logical functions presented in FIG. 4.

In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 400 may include one or more operations, functions, or actions as illustrated by one or more of blocks 402-404. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 4, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 402, the method 400 includes simultaneously cycling a plurality of pallets 304 through a conveyor system 202. The conveyor system 202 is cyclical, and the conveyor system 202 includes an entrance point 208 for each pallet, an exit point 210, and a plurality of manufacturing points corresponding to a plurality of manufacturing devices 117. For example, the conveyor system 202 may be configured as shown in FIGS. 2A and 2B. Simultaneously cycling the plurality of pallets 304 includes simultaneously cycling the plurality of pallets 304 past the plurality of manufacturing points for two or more cycles. Each pallet is associated with a set of manufacturing instructions for a corresponding object. For example the set of manufacturing instructions can be stored on the pallet, and can indicate steps that should be performed to manufacture the corresponding object.

At block 404, the method 400 includes, while simultaneously cycling the plurality of pallets 304 through the conveyor system 202, using a different combination of the plurality of manufacturing devices 117 to manufacture each object in accordance with the set of manufacturing instructions associated with each pallet, thereby manufacturing different objects for each pallet. Using the system 200 of FIGS. 2A and 2B as an illustrative example, the second object 220 may be manufactured using a first pattern of the first manufacturing device 204 and the second manufacturing device 206, and the fourth object 226 may be manufactured using a second pattern that is different from the first pattern.

Within examples, the method 400 further includes encoding a set of manufacturing instructions for each object on each corresponding pallet. The one or more manufacturing devices 117 are configured to manufacture each object based on the manufacturing instructions on each corresponding pallet. For example, each manufacturing device can read the encoded manufacturing instructions. In related examples, each pallet includes a radio-frequency identification (RFID) chip, and encoding the set of manufacturing instructions for each object on each corresponding pallet includes encoding the set of manufacturing instructions on the RFID chip. In additional related examples, each of the plurality of manufacturing devices 117 is configured to encode manufacturing details for each object onto each corresponding pallet. In these examples, the method further includes evaluating performance of the one or more manufacturing devices 117 based on the one or more manufacturing details encoded onto each corresponding pallet. Evaluating performance of the one or more manufacturing devices 117 based on the one or more manufacturing details encoded onto each corresponding pallet can include reading the set of manufacturing instructions and the one or more manufacturing details from each pallet, providing the set of manufacturing instructions and the one or more manufacturing details from each pallet to a machine learning model 314, and evaluating performance of the one or more manufacturing devices 117 based on an output of the machine learning model.

Within examples, the method 400 further includes determining a number of pallets on the conveyor system 202, based on (i) the number of pallets on the conveyor system 202 and (ii) manufacturing instructions encoded on the pallets on the conveyor system 202, determining a level of usage for each manufacturing device, and, based on the level of usage for a given manufacturing device being less than a threshold level, selecting an additional pallet to enter the conveyor system 202. For example, the number of pallets and the manufacturing instructions may indicate a percentage of time that each manufacturing device is expected to perform manufacturing tasks, and the percentage can be used as the level of usage. If the percentage for a particular manufacturing device is below a threshold (e.g., 85%), a pallet can be added to increase the percentage of time that the particular manufacturing device performs manufacturing tasks. Within examples, the added pallet can be encoded with manufacturing instructions for an object that requires manufacturing tasks performed by the particular manufacturing device.

Within examples, the method 400 further includes determining that a first object has been manufactured in accordance with its manufacturing instructions based on a status message from a given manufacturing device, and, based on determining that the first object has been manufactured, causing a first pallet that corresponds to the first object to leave the conveyor system 202 at the exit point. Using the system 200 of FIGS. 2A and 2B as an illustrative example, the first manufacturing device 204 may provide a status message that the sixth object 234 has been manufactured, prompting the sixth pallet 232 to exit the conveyor system 202 at the exit point 210.

Within examples, a first pallet of the plurality of pallets 304 remains on the conveyor system 202 for a first number of cycles, a second pallet of the plurality of pallets 304 remains on the conveyor system 202 for a second number of cycles, and the first number of cycles is different from the second number of cycles. For example, this may be due to the first pallet and the second pallet corresponding to different objects. In these examples, the method 400 further includes training a machine learning model 314 based on the first number of cycles and the second number of cycles.

Within examples, each of the plurality of manufacturing devices 117 is configured to encode manufacturing details for each object onto each corresponding pallet. In these examples, the method 400 further includes reading the one or more manufacturing details from each pallet after manufacturing each object, and training a machine learning model 314 using the one or more manufacturing detail. In these examples, simultaneously cycling the plurality of pallets 304 through the conveyor system 202 includes simultaneously cycling the plurality of pallets 304 through the conveyor system 202 based on an output from the machine learning model 314.

Within examples, each of the plurality of manufacturing devices 117 is configured to encode manufacturing details for each object onto each corresponding pallet. In these examples, the method 400 further includes reading the one or more manufacturing details from each pallet after manufacturing each object, training a machine learning model 314 using the one or more manufacturing details, and determining that one or more of the plurality of manufacturing devices 117 should be maintained based on an output from the machine learning model. For example, the machine learning model 314 may use the manufacturing details from each pallet to evaluate trends in how quickly each manufacturing device is performing manufacturing tasks relative to expected values. Within examples, this may be performed as described above with respect to FIG. 3.

Within examples, the method 400 further includes receiving a list of parts for a system assembly. For example, the central controller 302 can receive the list from another computing device. Each of the plurality of objects corresponds to a part in the list of parts, and the method 400 further includes determining an order for manufacturing the plurality of objects based on (i) an assembly plan for the system assembly and (ii) an expected level of usage for each of the plurality of manufacturing devices 117 associated with the order. In these examples, simultaneously cycling the plurality of pallets 304 through the conveyor system 202 includes simultaneously cycling the plurality of pallets 304 through the conveyor system 202 in accordance with the order. This allows the system 100 to optimize assembly of the system assembly by providing parts in a desired order.

Thus, the systems and methods described herein provide a framework for quickly manufacturing a plurality of parts simultaneously. By encoding pallets with instructions for each object, manufacturing devices 117 can automatically perform manufacturing tasks, thereby reducing communications between a central controller and the manufacturing devices 117. By encoding pallets with manufacturing details as objects are manufactured, manufacturing devices 117 can be evaluated for performance and ordering objects for manufacture can be optimized. Accordingly, the examples described herein result in an adaptive system that improves over multiple iterations.

By the term "substantially," "similarity," and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

By the term "simultaneously," it is meant that at least a portion of two different functions are being performed contemporaneously. For example, by referring to a plurality of objects being manufactured simultaneously, it is meant that two or more objects are contemporaneously disposed on a conveyor system used for manufacturing the objects.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A system comprising:
    pallets;
    a plurality of manufacturing devices each comprising a computing device, wherein each of the manufacturing devices is configured for performing different aspects of manufacturing objects, wherein the plurality of manufacturing devices are each configured to lay material for the objects with an orientation relative to the pallets that is different from the other manufacturing devices of the plurality of manufacturing devices;
    a conveyor system configured for moving each of the pallets to one or more manufacturing devices of the plurality of manufacturing devices, wherein the conveyor system is cyclical, and wherein the conveyor system comprises an entrance point for the pallets, an exit point, and manufacturing points corresponding to the plurality of manufacturing devices; and
    an additional computing device comprising:
        one or more processors; and
        a non-transitory computer readable medium having instructions stored thereon that, when executed by the one or more processors, cause performance of functions comprising:
            simultaneously cycling the pallets through the conveyor system and past the manufacturing points for two or more cycles, wherein each of the pallets is associated with a set of manufacturing instructions for each of the objects; and
            while simultaneously cycling the pallets through the conveyor system, using a different combination of the plurality of manufacturing devices to manufacture each of the objects in accordance with the set of manufacturing instructions associated with each of the pallets, thereby manufacturing the objects for each of the pallets.

2. The system of claim 1, wherein the functions further comprise:

encoding the set of manufacturing instructions for each of the objects on each of the pallets, wherein the one or more manufacturing devices are configured to manufacture each of the objects based on the set of manufacturing instructions on each of the pallets.

3. The system of claim 2, wherein each of the pallets comprises a radio-frequency identification (RFID) chip, and wherein the set of manufacturing instructions are encoded on the RFID chip.

4. The system of claim 1, wherein each of the plurality of manufacturing devices is configured to encode manufacturing details for each of the objects onto each of the pallets, the manufacturing details comprising an amount of material laid for the object by the manufacturing device, wherein the functions further comprise:
   evaluating performance of the one or more manufacturing devices based on the manufacturing details encoded onto each of the pallets.

5. The system of claim 4, wherein evaluating performance of the one or more manufacturing devices comprises:
   reading the set of manufacturing instructions and the manufacturing details from each of the pallets;
   providing the set of manufacturing instructions and the manufacturing details from each of the pallets to a machine learning model; and
   evaluating performance of the one or more manufacturing devices based on an output of the machine learning model.

6. The system of claim 1, wherein simultaneously cycling the pallets comprises simultaneously cycling the pallets such that a first pallet of the pallets remains on the conveyor system for a first number of cycles and a second pallet of the pallets remains on the conveyor system for a second number of cycles, wherein the first number of cycles is different from the second number of cycles.

7. The system of claim 1, wherein the plurality of manufacturing devices each comprise a multi-spindle lamination cell.

8. A method for simultaneously manufacturing objects, the method comprising:
   simultaneously cycling pallets through a conveyor system, wherein the conveyor system is cyclical, and wherein the conveyor system comprises an entrance point for the pallets, an exit point, and manufacturing points corresponding to a plurality of manufacturing devices, the plurality of manufacturing devices each comprising a computing device, wherein simultaneously cycling the pallets comprises simultaneously cycling the pallets past the manufacturing points for two or more cycles, wherein each of the pallets is associated with a set of manufacturing instructions for each of the objects, wherein the plurality of manufacturing devices are each configured to lay material for the objects with an orientation relative to the pallets that is different from the other manufacturing devices of the plurality of manufacturing devices; and
   while simultaneously cycling the pallets through the conveyor system, using a different combination of the plurality of manufacturing devices to manufacture each of the objects in accordance with the set of manufacturing instructions associated with each of the pallets, thereby manufacturing the objects for each of the pallets.

9. The method of claim 8, further comprising:
   encoding the set of manufacturing instructions for each of the objects on each of the pallets, and the one or more manufacturing devices manufacturing each of the objects based on the set of manufacturing instructions on each of the pallets.

10. The method of claim 9, wherein each of the pallets comprises a radio-frequency identification (RFID) chip, and wherein encoding the set of manufacturing instructions for each of the objects comprises encoding the set of manufacturing instructions on the RFID chip.

11. The method of claim 8, further comprising: the plurality of manufacturing devices encoding manufacturing details for each of the objects onto each of the pallets, and
   evaluating performance of the one or more manufacturing devices based on the manufacturing details encoded onto each of the pallets.

12. The method of claim 11, wherein evaluating performance of the one or more manufacturing devices comprises:
   reading the set of manufacturing instructions and the manufacturing details from each of the pallets;
   providing the set of manufacturing instructions and the manufacturing details from each of the pallets to a machine learning model; and
   evaluating performance of the one or more manufacturing devices based on an output of the machine learning model.

13. The method of claim 8, further comprising:
   determining a number of the pallets on the conveyor system;
   based on (i) the number of the pallets on the conveyor system and (ii) the set of manufacturing instructions encoded on each of the pallets on the conveyor system, determining a level of usage for each of the plurality of manufacturing devices; and
   based on the level of usage for a given manufacturing device being less than a threshold level, selecting an additional pallet to enter the conveyor system.

14. The method of claim 8, further comprising:
   determining that a first object has been manufactured in accordance with its manufacturing instructions based on a status message from a given manufacturing device; and
   based on determining that the first object has been manufactured, causing a first pallet that corresponds to the first object to leave the conveyor system at the exit point.

15. The method of claim 8, wherein a first pallet of the pallets remains on the conveyor system for a first number of cycles, wherein a second pallet of the pallets remains on the conveyor system for a second number of cycles, and wherein the first number of cycles is different from the second number of cycles, the method further comprising:
   training a machine learning model based on the first number of cycles and the second number of cycles.

16. The method of claim 8, further comprising: the plurality of manufacturing devices encoding manufacturing details for each of the objects onto each of the pallets,
   reading the manufacturing details from each of the pallets after manufacturing each of the objects; and
   training a machine learning model using the manufacturing details,
   wherein simultaneously cycling the pallets through the conveyor system comprises simultaneously cycling the pallets through the conveyor system based on an output from the machine learning model.

17. The method of claim 8, further comprising: the plurality of manufacturing devices encoding manufacturing details for each of the objects onto each of the pallets, reading the manufacturing details from each of the pallets after manufacturing each of the objects;

training a machine learning model using the manufacturing details; and determining that one or more of the plurality of manufacturing devices should be maintained based on an output from the machine learning model.

18. The method of claim 8, further comprising:

receiving a list of parts for a system assembly, wherein each of the objects corresponds to a part in the list of parts; and determining an order for manufacturing the objects based on (i) an assembly plan for the system assembly and (ii) an expected level of usage for each of the plurality of manufacturing devices associated with the order, wherein simultaneously cycling the pallets through the conveyor system comprises simultaneously cycling the pallets through the conveyor system in accordance with the order.

19. A non-transitory computer readable medium having instructions stored thereon that, when executed by one or more processors, cause performance of functions for simultaneously manufacturing objects, the functions comprising:

simultaneously cycling pallets through a conveyor system, wherein the conveyor system is cyclical, and wherein the conveyor system comprises an entrance point for the pallets, an exit point, and a plurality of manufacturing points corresponding to a plurality of manufacturing devices, the plurality of manufacturing devices each comprising a computing device, wherein simultaneously cycling the pallets comprises simultaneously cycling the pallets past the plurality of manufacturing points for two or more cycles, wherein each of the pallets is associated with a set of manufacturing instructions, wherein the plurality of manufacturing devices are each configured to lay material for the objects with an orientation relative to the pallets that is different from the other manufacturing devices of the plurality of manufacturing devices; and while simultaneously cycling the pallets through the conveyor system, using a different combination of the plurality of manufacturing devices to manufacture each of the objects in accordance with the set of manufacturing instructions.

20. The non-transitory computer readable medium of claim 19, wherein the functions further comprise: encoding the set of manufacturing instructions for each of the objects on each of the pallets, wherein the one or more manufacturing devices are configured to manufacture each of the objects based on the set of manufacturing instructions on each of the pallets.

* * * * *